(12) United States Patent
Hsu et al.

(10) Patent No.: US 6,249,745 B1
(45) Date of Patent: Jun. 19, 2001

(54) GRAVITY VECTOR COMPENSATION SYSTEM

(75) Inventors: David Y. Hsu, Agoura Hills; Allan J. Brockstein, Chatsworth, both of CA (US)

(73) Assignee: Litton Systems, Inc., Woodland Hills, CA (US)

( * ) Notice: Subject to any disclaimer, the term of this patent is extended or adjusted under 35 U.S.C. 154(b) by 0 days.

(21) Appl. No.: 09/309,796

(22) Filed: May 11, 1999

(51) Int. Cl.⁷ .............................. G01C 21/00; G01C 21/20
(52) U.S. Cl. .................... 701/220; 701/200; 701/207; 701/221
(58) Field of Search ....................... 701/200, 207, 701/220, 221, 224

(56) References Cited

U.S. PATENT DOCUMENTS

| | | | |
|---|---|---|---|
| 3,545,266 | * | 12/1970 | Wilson ............................ 701/220 X |
| 4,173,784 | * | 11/1979 | Heath et al. ........................ 701/220 |
| 5,272,639 | * | 12/1993 | McGuffin .......................... 701/207 |
| 5,305,236 | * | 4/1994 | Germanetti ........................ 701/221 |
| 5,321,631 | * | 6/1994 | Germanetti ........................ 701/221 |
| 5,339,684 | * | 8/1994 | Jircitano et al. ................. 701/220 X |
| 5,402,340 | * | 3/1995 | White et al. ..................... 701/221 X |
| 5,774,832 | * | 6/1998 | Vanderwerf ........................ 701/220 |
| 6,073,077 | * | 6/2000 | Hsu .................................... 701/220 |

* cited by examiner

Primary Examiner—Bernarr E. Gregory
(74) Attorney, Agent, or Firm—Robert E. Malm

(57) ABSTRACT

The invention is a method and apparatus for gravity vector compensation in an inertial navigation system (INS). The INS obtains its position and determines a gravity-model vector at its position using a predetermined gravity model. The deflection of vertical (DOV), the error in the direction of the gravity-model vector, is expressed in terms of a North-South (N-S) DOV component and an East-West (E-W) DOV component. Matrices of N-S DOV and E-W DOV data are stored in memory in a plurality of files for a plurality of discrete points distributed over the surface of the earth at a plurality of altitudes. The elements of a matrix of N-S DOV data or E-W DOV data have a one-to-one correspondence with a two-dimensional array of discrete contiguous points at a specified altitude above the earth's surface. Adjacent elements in a matrix correspond to (1) adjacent points on a parallel of latitude or (2) adjacent points on a half-circle meridian, a half-circle meridian terminating at the two poles of the earth. The method consists of obtaining the INS position, separately translating the N-S DOV data and the E-W DOV data from a plurality of matrices into a plurality of supermatrices, determining the N-S DOV and the E-W DOV at the INS position utilizing data from the plurality of supermatrices, and finally compensating the direction of the gravity-model vector for the N-S DOV and the E-W DOV.

23 Claims, 3 Drawing Sheets

GRAVITY VECTOR COMPENSATION SYSTEM

CROSS-REFERENCE TO RELATED APPLICATIONS (Not applicable)

STATEMENT REGARDING FEDERALLY SPONSORED RESEARCH AND DEVELOPMENT (Not applicable)

BACKGROUND OF THE INVENTION

This invention relates generally to inertial navigation systems which require gravity vector data in their operational regions and more specifically to methods for determining the deflection of the gravity vector at a point above the earth's surface given gravity vector deflection data for a three-dimensional grid of points above the earth's surface.

World wide deflection of vertical (DOV) data provided by the National Imagery and Mapping Agency (NIMA) can be used to compensate the mismodeled gravity vector error, thereby reducing velocity and position errors from an inertial navigation system.

NIMA provides DOV data on 32 CD-ROMs with each CD/ROM containing a 45°×45° sector of data. DOV data (East-West, North-South, as well as associated accuracies) are stored in files corresponding to grid points that are 2 arcminutes apart in 1°×1° cells.

The future NIMA DOV database will consist of 180× 360+1=64,801 files at one altitude. There will be seven reference altitudes at 0, 10K, 20K, 30K, 50K, 70K, and 90K feet. This represents the NIMA-supplied data for the F-117 aircraft.

Each of the 64,801 files (except for the one discussed in the next paragraph) contains DOV data and accuracy data (all in arcseconds) of 900 grid points at 2 arcminutes spacing in a 1°×1° angular cell as shown in FIG. 1. The files are labeled from N01000, N01001, . . . , N01359, N02000, . . . , to N90359 and S0000, S00001, . . . , S00359, S01000, . . . , to S89359. Each file is 29,025 bytes in size.

The remaining file is named S90000. It contains the DOV and accuracy data for the south pole repeated 900 times to maintain the uniformity of data files.

BRIEF SUMMARY OF THE INVENTION

The invention is a method and apparatus for gravity vector compensation in an inertial navigation system (INS). The INS obtains its position, in terms of latitude, longitude and altitude, and determines a gravity-model vector at its position using a predetermined gravity model. There is an error between the gravity-model vector and the true gravity vector.

The error in the direction of the gravity-model vector is referred to as deflection of vertical (DOV), the DOV being expressed in terms of a North-South (N-S) DOV component and an East-West (E-W) DOV component. Matrices of N-S DOV and E-W DOV data are stored in memory in a plurality of files for a plurality of discrete points distributed over the surface of the earth at a plurality of altitudes.

The elements of a matrix of N-S DOV data or E-W DOV data have a one-to-one correspondence with a two-dimensional array of discrete contiguous points at a specified altitude above the earth's surface, the array of points having (1) latitude values in a specified range of latitude values, (2) longitude values in a specified range of longitude values, and (3) an altitude value in a specified range of altitude values. Adjacent elements in a matrix correspond to (1) adjacent points on a parallel of latitude or (2) adjacent points on a half-circle meridian, a half-circle meridian terminating at the two poles of the earth.

The first step of the method consists of obtaining the INS position.

The second step of the method consists of separately translating the N-S DOV data and the E-W DOV data from a plurality of matrices into a plurality of supermatrices. The INS latitude and longitude values are within the specified ranges of latitude and longitude and the INS altitude is greater than the altitude value of at least one matrix. The INS latitude and longitude values are within the specified ranges of latitude and longitude, and the INS altitude is less than the altitude value of at least one matrix.

The adjacent elements of a supermatrix correspond to (1) adjacent points on a parallel of latitude or (2) adjacent points on a whole-circle meridian. The elements of a supermatrix all correspond to the same altitude value.

The third step of the method consists of determining the N-S DOV and the E-W DOV at the INS position utilizing data from the plurality of supermatrices.

The fourth step of the method consists of compensating the direction of the gravity-model vector for the N-S DOV and the E-W DOV.

DETAILED DESCRIPTION OF THE INVENTION

As a vehicle navigates over the earth, an inertial navigation system (INS) utilizes an 8×8 array consisting of 64 points at a reference altitude above the vehicle and a corresponding array of 64 points at a reference altitude below the vehicle to determine the North-South and East-West components of the DOV at the vehicle location by means of 64 linear interpolations between the altitudes and 9 natural cubic spline interpolations between the horizontal data points.

A cubic spline interpolation is a piecewise third-order polynomial approximation that divides an interval into a collection of subintervals and constructs an approximating cubic polynomial on each subinterval. A natural cubic spline interpolation is one where the second derivative of the cubic spline interpolation function at the interval boundaries are set equal to zero.

The natural cubic spline interpolation is fully described in Daniel Zwillinger, Editor-in Chief, *STANDARD MATHEMATICAL TABLES AND FORMULAE*, 30th ed., CRC Press, Inc., Boca Raton, Fla., 1996, p. 680.

Figure 1:
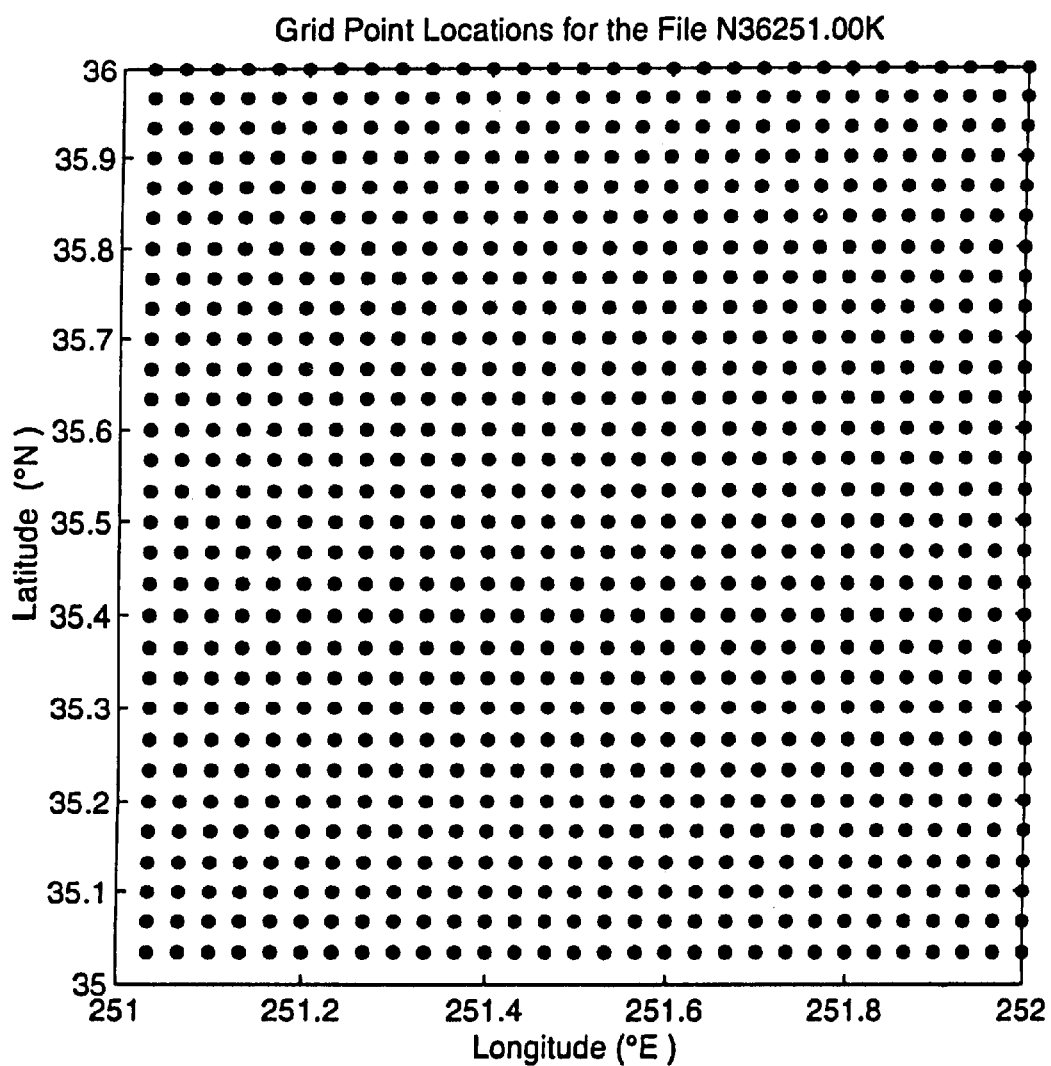
FIG. 1 shows the 900 grid points in a DOV cell corresponding to N36251.
Figure 2:
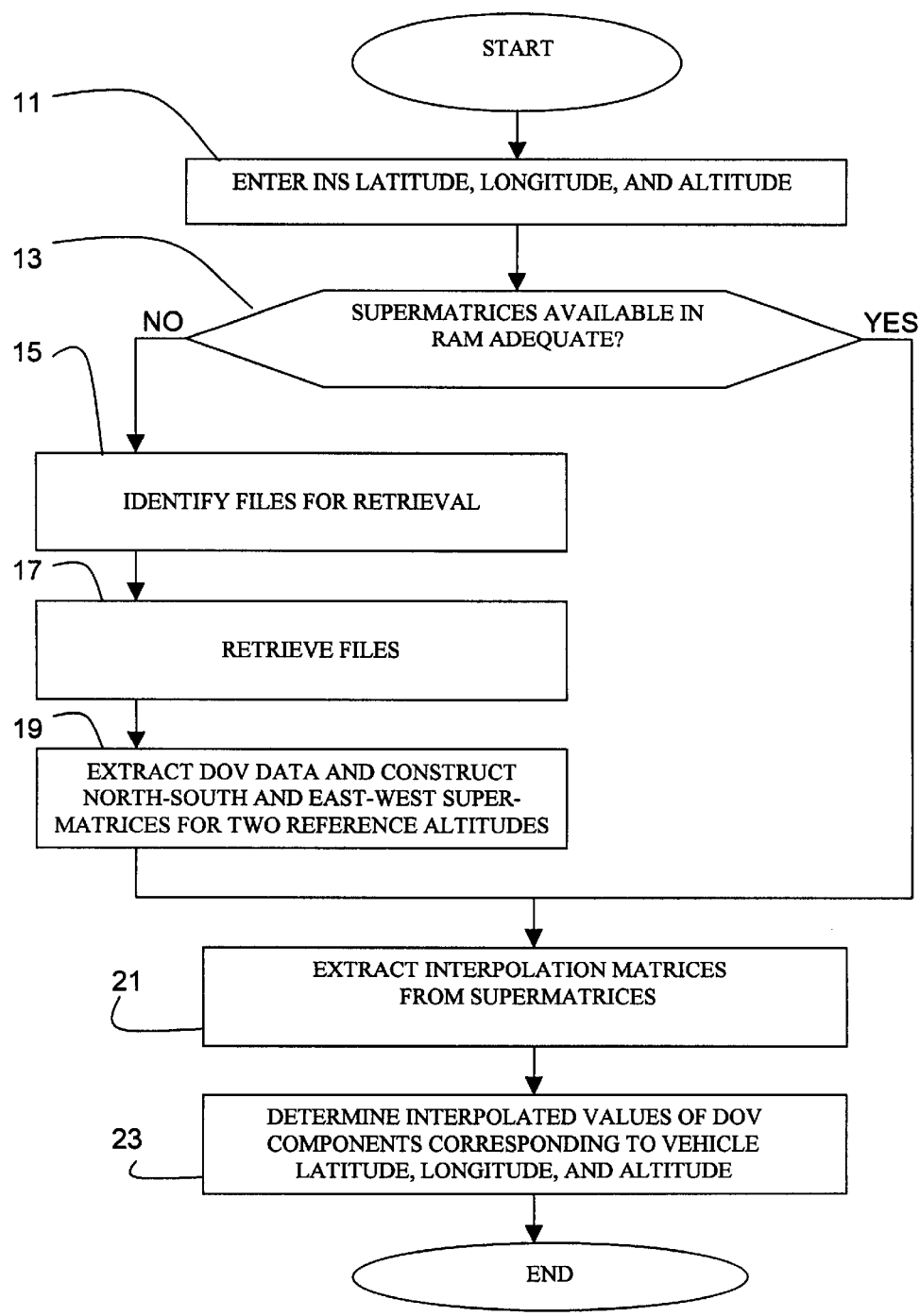
FIG. 2 shows a flow diagram for the method of the invention.
Figure 3:
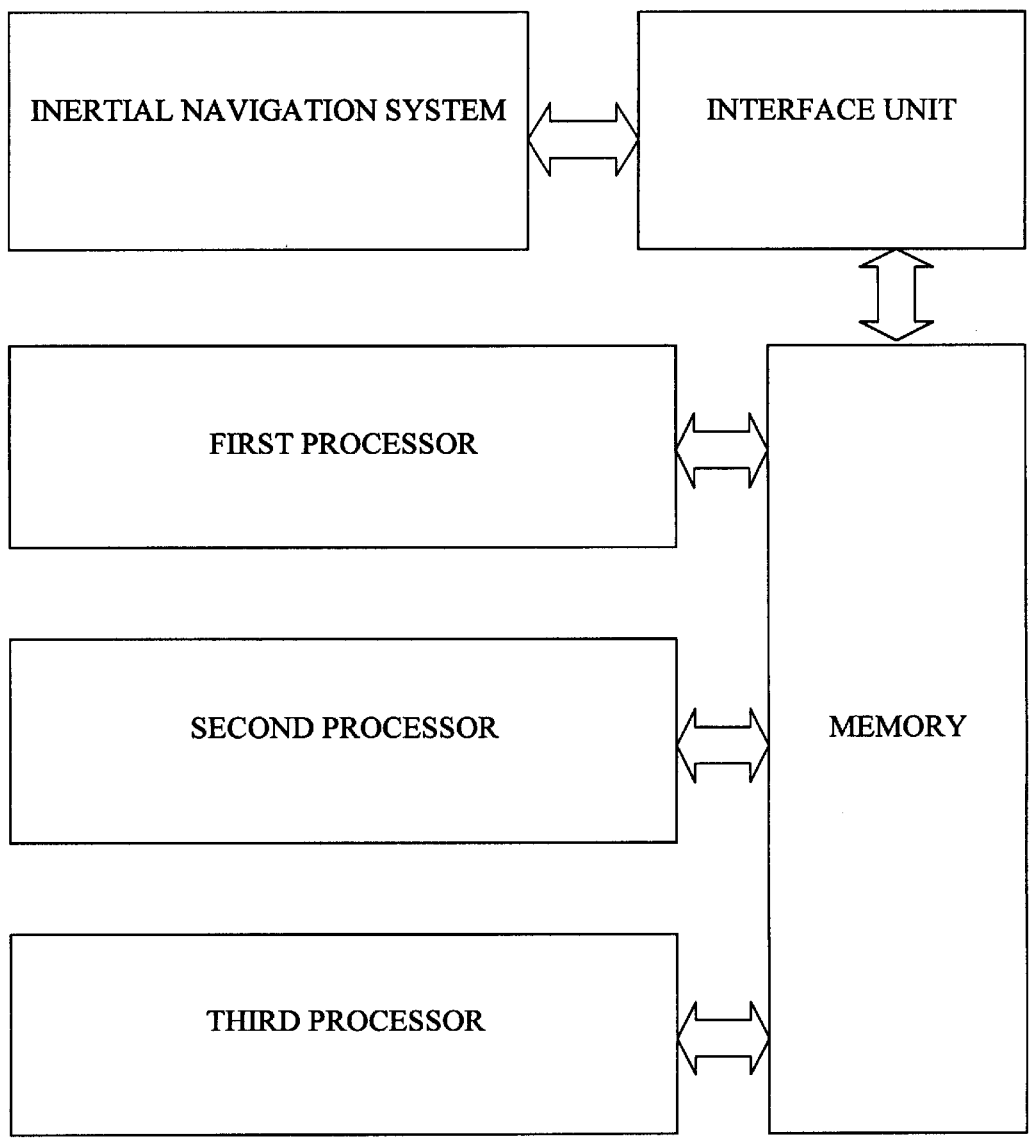
FIG. 3 shows a block-diagram embodiment of apparatus for gravity vector compensation in an inertial navigation system.

The flow diagram governing the operations of a processor in determining the DOV of a vehicle is shown in FIG. 2. The first step 11 of the process begins with an interrupt from the INS indicating the availability of new position information.

The program causes the processor to enter into RAM the latitude, longitude, and altitude coordinates ($\phi_v$, $\lambda_v$, $h_v$) of the vehicle supplied by the INS.

The second step 13 consists of determining whether the 90×90 North-South and East-West supermatrices of DOV data presently in RAM are adequate. A supermatrix is constructed from the elements of a 30×30 900-element primary matrix that corresponds at the time of data retrieval to a region containing the vehicle together with eight 30×30 900-element secondary matrices that surround the primary matrix. The elements of the North-South and East-West matrices contain respectively the North-South and East-West components of the DOV and are identified within a matrix by the latitude $\phi_m$ and longitude $\lambda_m$.

The nine matrices that constitute a supermatrix are so arranged that for most of the earth's surface, the elements of the supermatrix can also be identified by the latitude $\phi_m$ and longitude $\lambda_m$ but with $\phi_m$ and $\lambda_m$ each taking on 90 contiguous values for most of the earth's surface. When a supermatrix includes elements that surround either the North or South pole, there are discontinuities in $\phi_m$ and $\lambda_m$. However, adjoining elements of a supermatrix always correspond to adjoining points above the earth's surface.

There are North-South and East-West matrices and supermatrices for each of seven reference altitudes $h_m$.

It is necessary at some point in the process to extract interpolation matrices from supermatrices at two reference altitudes for the purpose of obtaining the DOV components at the position of the vehicle. If the interpolation matrices are not within the latitude, longitude, and altitude bounds of the supermatrices, then new supermatrices must be retrieved from memory and stored in RAM. If the answer to the question posed in step 13 is yes, the program jumps to step 21. If the answer is no, files containing the primary and secondary matrices are identified and designated for retrieval in step 15. The primary matrices are those for which the bounding latitudes and longitudes also bound the vehicle position. The designated files containing the primary and secondary matrices are retrieved into RAM in step 17.

The four required supermatrices are constructed in step 19. Two superrnatrices contain the North-South and East-West components of the DOV for the reference altitude just below the vehicle altitude, and the other two supermatrices contain the North-South and East-West components of the DOV for the reference altitude just above the vehicle altitude. In discussing the construction of the supermatrices, the k'th 30×30 matrix that contains the North-South DOV components will be denoted by $[\xi]_k$. Similarly, the k'th 30×30 matrix that contains the East-West DOV components will be denoted by $[\eta]_k$.

Let us consider a vehicle position in the northern hemisphere away from the north pole and the equator. For purposes of data retrieval, if the vehicle position is given by $(100_v,\lambda_v)=(35.4°\times251.3°)$, then the primary matrix for each reference altitude is contained in the file with the label N36251. The files containing the eight secondary matrices are identified below.

|  | 250° < λ ≦ 251° | 251° < λ ≦ 252° | 252° < λ ≦ 253° |
|---|---|---|---|
| 36° < φ ≦ 37° | N37250 | N37251 | N37252 |
| 35° < φ ≦ 36° | N36250 | N36251 | N36252 |
| 34° < φ ≦ 35° | N35250 | N35251 | N35252 |

The supermatrix that contains all 90×90 North-South DOV components of these nine matrices is $$[\xi] = \begin{bmatrix} [\xi]_9 & [\xi]_2 & [\xi]_3 \\ [\xi]_8 & [\xi]_1 & [\xi]_4 \\ [\xi]_7 & [\xi]_6 & [\xi]_5 \end{bmatrix} \quad (1)$$

The supermatrix that contains all 90×90 East-West DOV components of these nine matrices is $$[\xi] = \begin{bmatrix} [\eta]_9 & [\eta]_2 & [\eta]_3 \\ [\eta]_8 & [\eta]_1 & [\eta]_4 \\ [\eta]_7 & [\eta]_6 & [\eta]_5 \end{bmatrix} \quad (2)$$

Let us now consider a vehicle position in the southern hemisphere away from the south pole and the equator. If the vehicle position is given by $(\phi_v,\lambda_v)=(-35.4°,251.3°)$, then the primary matrix for each reference altitude is contained in the file with the label S35251. The eight adjoining secondary matrices are contained in the files indicated below.

|  | 250° < λ ≦ 251° | 251° < λ ≦ 252° | 252° < λ ≦ 253° |
|---|---|---|---|
| −35° < φ ≦ −34° | S34250 | S34251 | S34252 |
| −36° < φ ≦ −35° | S35250 | S35251 | S35252 |
| −37° < φ ≦ −36° | S36250 | S36251 | S36252 |

The supermatrices that contain all 90×90 North-South DOV components and all 90×90 East-West DOV components for these nine matrices are similar to those given in equations (1) and (2).

Now consider a point in the northern hemisphere near the equator. If the point is given by $(\phi_v,\lambda_v)=(0.4°,121.3°)$, then the primary matrix for each reference altitude is contained in the file with the label N01121. The files containing the eight secondary matrices are identified below.

|  | 120° < λ ≦ 121° | 121° < λ ≦ 122° | 122° < λ ≦ 123° |
|---|---|---|---|
| 1° < φ ≦ 2° | N02120 | N02121 | N02122 |
| 0° < φ ≦ 1° | N01120 | N01121 | N01122 |
| −1° < φ ≦ 0° | S00120 | S00121 | S00122 |

Notice the mixture of Nyyxxx and Syyxxx files. The supermatrices that contain all 90×90 North-South DOV components and all 90×90 East-West DOV components for these nine matrices are similar to those given in equations (1) and (2).

Now let us consider a vehicle location in the southern hemisphere near the equator. If the vehicle location is given by $(\phi_v,\lambda_v)=(-0.4°,121.3°)$, then the primary matrix for each reference altitude is contained in the file with the label S00121. The files containing the eight secondary matrices are identified below.

|  | $120° < \lambda \leq 121°$ | $121° < \lambda \leq 122°$ | $122° < \lambda \leq 123°$ |
|---|---|---|---|
| $0° < \phi \leq 1°$ | N01120 | N01121 | N01122 |
| $-1° < \phi \leq 0°$ | S00120 | S00121 | S00122 |
| $-2° < \phi \leq -1°$ | S01120 | S01121 | S01122 |

Notice the mixture of Nyyxxx and Syyxxx files. The supermatrices that contain all 90×90 North-South DOV components for these nine cells are similar to those given in equations (1) and (2).

Let us now consider a point near the north pole. If the point is given by $(\phi_v, \lambda_v) = (89.4°, 121.3°)$, then it is located in the file with the label N90121. The files containing the eight secondary matrices are identified below.

|  | $302° < \lambda \leq 303°$ | $301° < \lambda \leq 302°$ | $300° < \lambda \leq 301°$ |
|---|---|---|---|
| $89° < \phi \leq 90°$ | N90302 | N90301 | N90300 |

|  | $120° < \lambda \leq 121°$ | $121° < \lambda \leq 122°$ | $122° < \lambda \leq 123°$ |
|---|---|---|---|
| $89° < \phi \leq 90°$ | N90120 | N90121 | N90122 |
| $88° < \phi \leq 89°$ | N89120 | N89121 | N89122 |

The matrix that contains all 90×90 North-South DOV components for these nine cells is $$[\xi] = \begin{bmatrix} [\xi]_9^* & [\xi]_2^* & [\xi]_3^* \\ [\xi]_8 & [\xi]_1 & [\xi]_4 \\ [\xi]_7 & [\xi]_6 & [\xi]_5 \end{bmatrix} \quad (3)$$

The matrix that contains all 90×90 East-West DOV components for these nine cells is $$[\eta] = \begin{bmatrix} [\eta]_9^* & [\eta]_2^* & [\eta]_3^* \\ [\eta]_8 & [\eta]_1 & [\eta]_4 \\ [\eta]_7 & [\eta]_6 & [\eta]_5 \end{bmatrix} \quad (4)$$

The asterisks in the top row of these two matrices indicate that the following four operations are performed before the matrices are patched together.

(1) Delete the first row from $[\xi]_9$, $[\xi]_2$, $[\xi]_3$, $[\eta]_9$, $[\eta]_2$, $[\eta]_3$;

(2) Pad these six matrices with a row of 30 zeros at the bottom so that each matrix still has 30 rows and 30 columns;

(3) Flip each of these matrices left to right (i.e. column 1 becomes column 30, column 2 becomes column 29, etc.);

(4) Flip each of these matrices upside down (i.e. row 1 becomes row 30, row 2 becomes row 29, etc.).

The reasons for these operations are:

(1) All files with the label N90xxx have the North pole as the common upper (northern) boundary, hence there are duplications;

(2) We need to preserve relative physical location of the grid points in the two augmented 90×90 matrices $[\xi]$, $[\eta]$.

Let us now consider a vehicle position near the south pole. If the vehicle position is given by $(\phi_v, \lambda_v) = (-89.4°, 121.3°)$, then it is located in the file with the label S89121. The files containing the eight secondary matrices are identified below.

|  | $120° < \lambda \leq 121°$ | $121° < \lambda \leq 122°$ | $122° < \lambda \leq 123°$ |
|---|---|---|---|
| $-89° < \phi \leq -88°$ | S88120 | S88121 | S88122 |
| $-90° < \phi \leq -89°$ | S89120 | S89121 | S89122 |

|  | $302° < \lambda \leq 303°$ | $301° < \lambda \leq 302°$ | $300° < \lambda \leq 301°$ |
|---|---|---|---|
| $-90° < \phi \leq -89°$ | S89302 | S89301 | S89300 |

The matrix that contains all 90×90 North-South DOV components for these nine cells is $$[\xi] = \begin{bmatrix} [\xi]_9 & [\xi]_2 & [\xi]_3 \\ [\xi]_8 & [\xi]_1 & [\xi]_4 \\ [\xi]_7^* & [\xi]_6^* & [\xi]_5^* \end{bmatrix} \quad (5)$$

The matrix that contains all 90×90 East-West DOV components for these nine cells is $$[\eta] = \begin{bmatrix} [\eta]_9 & [\eta]_2 & [\eta]_3 \\ [\eta]_8 & [\eta]_1 & [\eta]_4 \\ [\eta]_7^* & [\eta]_6^* & [\eta]_5^* \end{bmatrix} \quad (6)$$

The asterisks in the bottom row of these two matrices indicate that the following five operations are performed before the matrices are patched together.

(1) Delete the first row from $[\xi]_5$, $[\xi]_6$, $[\xi]_7$, $[\eta]_5$, $[\eta]_6$, $[\eta]_7$;

(2) Extract the North-South DOV component $\xi_{sp}$ and East-West DOV component $\eta_{sp}$ from S90000 (south pole DOV components) at two levels;

(3) Pad these six matrices with a row of 30 $\xi_{sp}$'s at the bottom of $[\xi]_5$, $[\xi]_6$, $[\xi]_7$ and a row of 30 $\eta_{sp}$'s at the bottom of $[\eta]_5$, $[\eta]_6$, $[\eta]_7$ so that each matrix still has 30 rows and 30 columns;

(4) Flip each of these matrices left to right (i.e. column 1 becomes column 30, column 2 becomes column 29, etc.);

(5) Flip each of these matrices upside down (i.e. row 1 becomes row 30, row 2 becomes row 29, etc.).

The reasons for these operations are:

(1) All files with the label S89xxx do not have south pole DOV's which must therefore be appended;

(2) We need to preserve relative physical location of the grid points in the two augmented 90×90 matices $[\xi]$, $[\eta]$.

Let us now consider a vehicle position in the northern hemisphere near the Greenwich meridian. If the vehicle position is given by $(\phi_v, \lambda_v) = (14.3°, 0.30°)$, then it is located in the file with the label N15000. The files containing the eight secondary matrices are identified below.

|  | $359° < \lambda \leq 360°$ | $0° < \lambda \leq 1°$ | $1° < \lambda \leq 2°$ |
|---|---|---|---|
| $15° < \phi \leq 16°$ | N16359 | N16000 | N16001 |
| $14° < \phi \leq 15°$ | N15359 | N15000 | N15001 |
| $13° < \phi \leq 14°$ | N14359 | N14000 | N14001 |

The matrices that contain all 90×90 all North-South and East-West DOV components for these nine cells are similar to those given in equations (1) and (2).

Let us now consider a vehicle position in the southern hemisphere near the Greenwich meridian. If the vehicle position is given by $(\phi_v, \lambda_v) = (-14.3°, 0.3°)$, then it is located in the file with the label S14000. The files containing the eight secondary matrices are identified below.

|  | $359° < \lambda \leq 360°$ | $0° < \lambda \leq 1°$ | $1° < \lambda \leq 2°$ |
|---|---|---|---|
| $-14° < \phi \leq -13°$ | S13359 | S13000 | S13001 |
| $-15° < \phi \leq -14°$ | S14359 | S14000 | S14001 |
| $-16° < \phi \leq -15°$ | S15359 | S15000 | S15001 |

The matrices that contain all 90×90 all North-South and East-West DOV components or these nine cells are similar to those given in equations (1) and (2).

Four interpolation matrices are extracted respectively from the four supermatrices in step 21. The interpolation matrices for the preferred embodiment of the invention are 8×8 64-element matrices. The interpolation matrices are chosen such that the latitudes of the fourth and fifth rows of the matrices bound the latitude of the vehicle and the longitudes of the fourth and fifth columns of the matrices bound the longitude of the vehicle.

Interpolated values for the North-South and East-West components of the DOV corresponding to the vehicle position $(\phi_v, \lambda_v)$ are obtained in step 23. An interpolation matrix containing the North-South DOV components and corresponding to the vehicle's altitude $\lambda_v$ is obtained by performing linear interpolations between the values contained in the two interpolation matrices containing the North-South DOV components and corresponding to reference altitudes above and below the vehicle's altitude $h_v$. An interpolation matrix containing the East-West DOV components and corresponding to the vehicle's altitude $h_v$ is obtained in a similar manner.

Interpolated values for the North-South DOV components corresponding to the vehicle's latitude and eight reference longitudes are obtained by natural 8-point cubic spline interpolations using the altitutde-interpolated interpolation matrix data. An interpolated value for the North-South DOV component corresponding to the vehicle's latitude and longitude is obtained by a natural 8-point cubic spline interpolation using the interpolated values corresponding to the vehicle's latitude. Interpolated values for the East-West DOV components are obtained in a similar fashion.

The preferred embodiment of the invention retrieves at any one time for a particular DOV component and a particular reference altitude the files containing the primary matrix and eight secondary matrices. Other embodiments could retrieve at various times (1) the primary matrix by itself, (2) the primary matrix and one secondary matrix, and (3) the primary matrix and three secondary matrices.

If the INS position $(\phi_v, \lambda_v, h_v)$ is in the central portion of the primary matrices, the 8×8 arrays that provide the basis for determining the DOV for the INS position can be extracted from the primary matrices, and it is necessary to retrieve only the primary cells from memory.

If, however, the INS position is near one of the bounding parallels of latitude or meridians (but not the intersection of a bounding parallel of latitude and a bounding meridian), it becomes necessary to also retrieve for each reference altitude the secondary matrix that is nearest to the INS position and adjacent to the primary matrix.

If the INS position is near the intersection of a bounding parallel of latitude and a bounding meridian, then it becomes necessary to retrieve for each reference altitude the three secondary matrices adjacent to the primary matrix and closest to the INS position.

To avoid the processing necessary to determine for each reference altitude of interest whether one, two, or four secondary matrices must be retrieved from memory, it may be desirable to always retrieve the primary matrix and three adjacent secondary matrices. The secondary matrices to be retrieved can be identified by determining the quadrant of the primary matrix in which the INS position is located.

It may even be more cost-effective to simply retrieve the eight secondary matrices surrounding a primary matrix since the only processing required in this case is to identify the primary cell for the INS position.

However many cells are retrieved at one time, a new set of cells must be retrieved whenever the DOV data available is insufficient to construct a DOV interpolation matrix surrounding the point INS position.

We have chosen for the preferred embodiment of the invention 30×30 900-point matrices, 90×90 8100-point supermatrices (one primary matrix and eight secondary matrices), and 8×8 interpolation matrices. Other embodiments may utilize matrices, supermatrices, and interpolation matrices of other sizes. The matrices, supermatrices, and interpolation matrices may be rectangular rather than square. A supermatrix may encompass any number of matrices.

Estimates of DOV components in the preferred embodiment for a particular altitude involves a linear interpolation between the elements of two interpolation matrices, one corresponding to a reference attitude less than the INS altitude and the other corresponding to a reference attitude greater than the INS altitude. The altitude interpolation could involve interpolation matrices for more than two reference altitudes.

An 8-point natural cubic spline interpolation is used in the preferred embodiment. However, other embodiments could use other interpolation methods based on other numbers of points.

The latitude, longitude, and altitude interpolations may be carried out in any order.

What is claimed is:

1. A method for gravity vector compensation in an inertial navigation system (INS), the INS obtaining the INS position in terms of latitude, longitude and altitude, the INS determining a gravity-model vector at the INS position using a predetermined gravity model, the error in the direction of the gravity-model vector being referred to as deflection of vertical (DOV), the DOV being expressed in terms of a North-South (N-S) DOV component and an East-West (E-W) DOV component, matrices of N-S DOV and E-W DOV data being stored in memory in a plurality of files for a plurality of discrete points distributed over the surface of the earth at a plurality of altitudes, the elements of a matrix of N-S DOV data or E-W DOV data having a one-to-one correspondence with a two-dimensional array of discrete contiguous points at a specified altitude above the earth's surface, the array of points having (1) latitude values in a specified range of latitude values, (2) longitude values in a specified range of longitude values, and (3) an altitude value in a specified range of altitude values, adjacent elements in a matrix corresponding to (1) adjacent points on a parallel of latitude or (2) adjacent points on a half-circle meridian, a half-circle meridian terminating at the two poles of the earth, the method comprising the steps:

(a) obtaining the INS position;
   (b) separately translating the N-S DOV data and the E-W DOV data from a plurality of matrices into a plurality of supermatrices, the INS latitude and longitude values being within the specified ranges of latitude and longitude and the INS altitude being greater than the altitude value of at least one matrix, the INS latitude and longitude values being within the specified ranges of latitude and longitude and the INS altitude being less than the altitude value of at least one matrix, the adjacent elements of a supermatrix corresponding to (1) adjacent points on a parallel of latitude or (2) adjacent points on a whole-circle meridian, the elements of a supermatrix all corresponding to the same altitude value;

(c) determining the N-S DOV and the E-W DOV at the INS position utilizing data from the plurality of supermatrices;

(d) compensating the direction of the gravity-model vector for the N-S DOV and the E-W DOV.

2. The method of claim 1 wherein step (b) comprises the step:

(b1) retrieving a new plurality of files from memory if the INS position is within a specified distance from the boundary points of a supermatrix.

3. The method of claim 1 wherein step (b) comprises the steps:

(b1) identifying at least one primary file, a primary file being a file containing at least one primary matrix, a primary matrix being a matrix for which the INS position is within the latitude and longitude ranges of the matrix;

(b2) identifying at least one secondary file, a secondary file being a file containing at least one secondary matrix, a secondary matrix being a matrix adjoining a primary matrix or a matrix adjoining two matrices that adjoin a primary matrix;

(b3) retrieving one or more primary files and one or more secondary files from memory.

4. The method of claim 3 wherein the primary and secondary files retrieved in step (b3) contain (1) matrices associated with one or more altitude values less than the INS altitude and (2) matrices associated with one or more altitude values greater than the INS altitude.

5. The method of claim 3 wherein one secondary matrix is retrieved for each primary matrix retrieved.

6. The method of claim 3 wherein three secondary matrices are retrieved for each primary matrix retrieved.

7. The method of claim 3 wherein eight secondary matrices are retrieved for each primary matrix retrieved.

8. The method of claim 1 wherein in step (b) for each DOV component there is one supermatrix for the altitude value less than and closest to the INS altitude and another supermatrix for the altitude value greater than and closest to the INS altitude.

9. The method of claim 1 wherein in step (c) the determination of a DOV component comprises the steps:

(c1) extracting an interpolation matrix from each supermatrix, the INS latitude and longitude being within the latitude range and the longitude range of the interpolation matrix;

(c2) obtaining an interpolated value of the DOV component corresponding to the latitude, longitude, and altitude of the INS from the elements of the interpolation matrices.

10. The method of claim 9 wherein L1 and L2 stand respectively for either latitude and longitude or longitude and latitude, step (c2) comprising the steps:

(c2a) obtaining an INS-altitude matrix, an element of the INS-altitude matrix being an interpolated value of the DOV component for the INS altitude based on the corresponding elements of the interpolation matrices;

(c2b) obtaining an INS-altitude/L1 column, an element of the INS-altitude/L1 column being an interpolated value of the DOV component for the INS altitude and L1 based on corresponding row elements of the INS-altitude matrix;

(c2c) obtaining an INS-altitude/L1/L2 value, the INS-altitude/L1/L2 value being an interpolated value of the DOV component for the INS altitude, L1, and L2 based on the elements of the INS-altitude/L1 column.

11. The method of claim 9 wherein L1 and L2 stand respectively for either latitude and longitude or longitude and latitude, step (c2) comprising the steps:

(c2a) obtaining for each interpolation matrix an INS-L1 column, an element of the INS-L1 column being an interpolated value of the DOV component for the INS L1 based on corresponding row elements of the interpolation matrix;

(c2b) obtaining an INS-L1/L2 value for each INS-L1 column, the INS-L1/L2 value being an interpolated value of the DOV component for the INS L1 and L2 based on the elements of the INS-L1 column;

(c2c) obtaining an INS-L1/L2/altitude value, the INS-L1/L2/altitude value being an interpolated value of the DOV component for the INS L1, L2, and altitude based on the INS-L1/L2 values for the interpolation matrices.

12. Apparatus for practicing the method of claim 1.

13. Apparatus for gravity vector compensation in an inertial navigation system (INS), the INS obtaining the INS position in terms of latitude, longitude and altitude, the INS determining a gravity-model vector at the INS position using a predetermined gravity model, the apparatus comprising:

a memory for storing matrices of N-S DOV and E-W DOV data in a plurality of files for a plurality of discrete points distributed over the surface of the earth at a plurality of altitudes, the error in the direction of the gravity-model vector being referred to as deflection of vertical (DOV), the DOV being expressed in terms of a North-South (N-S) DOV component and an East-West (E-W) DOV component, the elements of a matrix of N-S DOV data or E-W DOV data having a one-to-one correspondence with a two-dimensional array of discrete contiguous points at a specified altitude above the earth's surface, the array of points having (1) latitude values in a specified range of latitude values, (2) longitude values in a specified range of longitude values, and (3) an altitude value in a specified range of altitude values, adjacent elements in a matrix corresponding to (1) adjacent points on a parallel of latitude or (2) adjacent points on a half-circle meridian, a half-circle meridian terminating at the two poles of the earth;

an interface unit for obtaining the INS position;

a first processor for separately translating the N-S DOV data and the E-W DOV data from a plurality of matrices into a plurality of supermatrices, the INS latitude and longitude values being within the specified ranges of latitude and longitude and the INS altitude being greater than the altitude value of at least one matrix, the INS latitude and longitude values being within the specified ranges of latitude and longitude and the INS altitude being less than the altitude value of at least one matrix, the adjacent elements of a supermatrix corresponding to (1) adjacent points on a parallel of latitude or (2) adjacent points on a whole-circle meridian, the elements of a supermatrix all corresponding to the same altitude value;

a second processor for determining the N-S DOV and the E-W DOV at the INS position utilizing data from the plurality of supermatrices;

a third processor for compensating the direction of the gravity-model vector for the N-S DOV and the E-W DOV.

14. The apparatus of claim 13 wherein the first processor retrieves a new plurality of files from memory if the INS position is within a specified distance from the boundary points of a supermatrix.

15. The apparatus of claim 13 wherein the first processor (1) identifies at least one primary file, a primary file being a file containing at least one primary matrix, a primary matrix being a matrix for which the INS position is within the latitude and longitude ranges of the matrix, (2) identifies at least one secondary file, a secondary file being a file containing at least one secondary matrix, a secondary matrix being a matrix adjoining a primary matrix or a matrix adjoining two matrices that adjoin a primary matrix, and (3) retrieves one or more primary files and one or more secondary files from memory.

16. The apparatus of claim 15 wherein the retrieved primary and secondary files contain (1) matrices associated with one or more altitude values less than the INS altitude and (2) matrices associated with one or more altitude values greater than the INS altitude.

17. The apparatus of claim 15 wherein one secondary matrix is retrieved for each primary matrix retrieved.

18. The apparatus of claim 15 wherein three secondary matrices are retrieved for each primary matrix retrieved.

19. The apparatus of claim 15 wherein eight secondary matrices are retrieved for each primary matrix retrieved.

20. The apparatus of claim 13 wherein for each DOV component there is one supermatrix for the altitude value less than and closest to the INS altitude and another supermatrix for the altitude value greater than and closest to the INS altitude.

21. The apparatus of claim 13 wherein the second processor, in determining a DOV component, (1) extracts an interpolation matrix from each supermatrix, the INS latitude and longitude being within the latitude range and the longitude range of the interpolation matrix and (2) obtains an interpolated value of the DOV component corresponding to the latitude, longitude, and altitude of the INS from the elements of the interpolation matrices.

22. The apparatus of claim 21 wherein L1 and L2 stand respectively for either latitude and longitude or longitude and latitude, the second processor obtaining (1) an INS-altitude matrix, an element of the INS-altitude matrix being an interpolated value of the DOV component for the INS altitude based on the corresponding elements of the interpolation matrices, (2) an INS-altitude/L1 column, an element of the INS-altitude/L1 column being an interpolated value of the DOV component for the INS altitude and L1 based on corresponding row elements of the INS-altitude matrix, and (3) an INS-altitude/L1/L2 value, the INS-altitude/L1/L2 value being an interpolated value of the DOV component for the INS altitude, L1, and L2 based on the elements of the INS-altitude/L1 column.

23. The apparatus of claim 21 wherein L1 and L2 stand respectively for either latitude and longitude or longitude and latitude, the second processor obtaining (1) for each interpolation matrix an INS-L1 column, an element of the INS-L1 column being an interpolated value of the DOV component for the INS L1 based on corresponding row elements of the interpolation matrix, (2) an INS-L1/L2 value for each INS-L1 column, the INS-L1/L2 value being an interpolated value of the DOV component for the INS L1 and L2 based on the elements of the INS-L1 column, and (3) an INS-L1/L2/altitude value, the INS-L1/L2/altitude value being an interpolated value of the DOV component for the INS L1, L2, and altitude based on the INS-L1/L2 values for the interpolation matrices.

* * * * *